3,175,920
Patented Mar. 30, 1965

3,175,920
CORROSION PROTECTION AT INTERMEDIATE TEMPERATURES
Harold J. Michael, Columbus, Ohio, assignor to North American Aviation, Inc.
No Drawing. Filed May 8, 1961, Ser. No. 108,263
4 Claims. (Cl. 117—70)

This invention relates generally to corrosion protection at intermediate temperatures, and particularly concerns a method for providing a part having metallic surface material which readily oxidizes or corrodes when exposed to oxidizing or corroding environments at elevated temperatures with a high-temperature ceramic protective coating that develops increased resistance to chemical attack and prolonged life without significant deterioration for the part and its deterioration-susceptible surface material, especially at temperatures in an intermediate temperature range of from approximately 900° F. to approximately 1500° F.

Insofar as developing improved resistance to chemical attack and developing prolonged life without deterioration for the surface material during exposure to oxidation-causing and corrosion-causing environments at temperatures in an intermediate temperature range of from approximately 900° F. to approximately 1500° F. is concerned, the invention described and claimed herein offers advantages over the invention disclosed in my application Serial No. 103,243, filed April 17, 1961. Such advantages are essentially in the nature of eliminating process steps and process materials which are particularly important in connection with the use of high-temperature ceramic protective coatings to obtain improved protection against oxidation and corrosion at temperatures in the range of from approximately 1700° F. to approximately 2150° F.

As used in this application, the term "high-temperature ceramic protective coating" refers to a protective coating which is essentially comprised of glass frit and refractory constituents and which has an oxidation or corrosion protection service temperature upper limit in the range of from approximately 1700° F. to approximately 2150° F. Generally, such high-temperature ceramic protective coatings are applied to the to-be-protected parts in slip form and are fired to maturity in an air atmosphere at a temperature which is at least as high as approximately 1700° F.

Considerable difficulty has been experienced in adequately protecting oxidizable or corrosion-susceptible metallic surfaces against deterioration when such surfaces are subjected to an oxidizing or chemically corroding environment at elevated exposure temperatures. In my above-referenced co-pending application I described an invention which may be practiced to provide significantly improved protection for oxidizable metal surfaces in connection with exposure temperatures in the range of from approximately 1700° F. to approximately 2150° F. Such invention offers the same significant improved protection of oxidizable, etc. metallic surfaces at exposure temperatures in the range of from 900° F. to approximately 1700° F. However, through the elimination of certain materials and steps from practice of this invention, equally advantageous protection results may be obtained as to oxidizable and corrodible metallic surfaces which are subjected to deterioration-causing environments at temperatures in the intermediate range of from approximately 900° F. to approximately 1500° F. Generally speaking, conventional ceramic materials and known porcelain enamels are suitable to provide protection at temperatures up to the previously-suggested 900° F. level. The application of such materials frequently employs the use of an intermediate nickel film or deposit to develop the required coating adhesion. However, such ceramic and porcelain enamel materials relatively, readily deteriorate at temperatures above approximately 900° F. when subjected to oxidizing or chemically attacking atmospheres. Also, prior to my invention difficulty has been experienced in applying high-temperature ceramic materials to oxidizable surface metal.

This invention utilizes process steps wherein a part having an oxidizable or corrosion-susceptible metallic surface is first provided with an adhering thin overlay comprised of chromium and afterwards provided with a high-temperature ceramic protective coating in adhering relation to the chromium overlay. In the preferred practice of this invention the chromium overlay is developed by the electro-deposition of chromium on the processed part. As will be described in the specification, however, other techniques such as vapor diffusion may be employed to develop the necessary chromium overlay.

Several objects and numerous advantages may be realized through practice of this invention. Such objects and advantages are comparative with reference to parts having, and methods for developing, a high-temperature ceramic protective coating which is adhered to oxidizable surface metal either directly or by a known intermediate. Also, such objects and advantages are comparative with reference to deterioration of the surface metal of parts in environments which cause oxidation or chemical attack at a temperature in the range of from approximately 900° F. to about 1500° F.

An important object of this invention is to provide an improved process for applying a high-temperature ceramic protective coating to an oxidizable or corrosion-susceptible surface of a part to thereby develop increased service life for the part when employed in oxidation or corrosion-causing environments at temperatures in a temperature range extending from approximately 900° F. to an upper limit of approximately 1500° F.

Another object of this invention is to provide a process which may be advantageously practiced in connection with the application of high-temperature ceramic protective materials to metal surfaces of a base product to obtain improved adhesion of such protective materials entirely throughout a service temperature range which extends from as low as approximately −100° F. to as high as approximately 1500° F.

Another object of this invention is to provide a product which has oxidation or corrosion-susceptible surface material with a high-temperature ceramic protective coating that is characterized by a complete absence of porosity throughout operating temperature ranges which extend, at their upper limit, to approximately 1500° F. and that develops improved protection for all materials beneath the ceramic coating when subjected to oxidizing atmospheres and the like at such elevated operating temperatures.

A still further object of this invention is to provide a novel process for applying high-temperature ceramic protective materials to corrosion-susceptible metal surfaces of a base product whereby the resulting product is characterized by an improved ability to withstand thermal shock resulting from comparatively rapid thermal cycling throughout a range between the temperature limits of approximately −100° F. and 1500° F., without loss of corrosion protection.

Another object of this invention is to provide a ceramic-coated product having improved resistance to chemical attack at operating temperatures in the range of from approximately 900° F. to approximately 1500° F.

Another object of my invention is to provide a process for applying high-temperature ceramic protective coatings to oxidizable metal surfaces and which develops an improved wetting action during coating firing operations in air atmospheres at temperatures of approximately 1700° F. and above.

Another object of this invention is to provide a process method and resulting product which permits the substitution of non-premium steel and the like for costly corrosion-resistant alloy material in parts which must be subjected to oxidizing or corrosion-causing atmospheres at elevated temperatures extending to approximately 1500° F. and which develops improved resistance to oxidation and corrosion in comparison thereto.

Another object of this invention is to provide improved high-temperature ceramic protective coatings for base materials to develop increased resistance to torsion and bending loadings in the applied coating.

Other objects and advantages of this invention will become apparent during consideration of the following detailed description.

APPLICATION

The invention described herein has particular utility with respect to products which are fabricated of: steel, including cast steels, low-carbon steels (Types SAE 1010 and 1020, for example), and tool steels (Types SAE 4130 and H-11, for example), enameling iron, and copper. This invention also has application to compressed graphite or graphite-like components which have been previously provided with an exterior or surface ferrous plate. Such metals and surface materials generally readily oxidize at temperatures ranging from red heat values upwards. Also, such metals and surface materials are considered susceptible to deterioration when exposed to oxidation-causing or chemically corrosive atmospheres at temperatures in the range of from approximately 900° F. to about 1500° F. It is presently doubtful if significant advantages will be obtained if this invention is employed in an attempt to protect parts made of exotic metals such as molybdenum, niobium, tantalum, and the like against the effects of deterioration-causing atmospheres at elevated temperatures.

This invention has been utilized in connection with components fabricated of non-premium, low-carbon, cold-rolled steel such as SAE 1010. Steel of the SAE 1010 type is commonly employed in the manufacture of various boiler parts, engine parts, and the like. Such components are frequently exposed to corrosion-causing gases at a temperature which is in an intermediate temperature range such as from approximately 900° F. and upwards to approximately 1500° F.

PRE-TREATMENT

It is recommended that the metal surfaces of the component parts to be processed in accordance with this invention be pre-treated by suitable cleaning and abrading. Surfaces having oils or lubricants present thereon are preferably cleaned utilizing conventional solvent materials, or vapor degreasing techniques, or emulsion cleaning agents. If only very light oils or fingerprints are present on the metal surface, cleaning may be accomplished using known commercial alkaline cleaners. Afterwards the part should be rinsed and dried.

It is also recommended that the cleaned metal surface then be abraded using conventional abrasives. Sand blasting may be accomplished by delivering No. 40 mesh sharp sand by air blast at approximately 90 to 120 pounds per square inch air pressure uniformly over the surface of the to-be-processed part. As an alternate, fused alumina grit ranging from No. 60 mesh to No. 320 mesh may be substituted for sand. It is preferred that the air blast delivery pressure be kept to a minimum to avoid warpage when abrading thin, light-weight, or sheet-like base materials.

PROCESS STEPS

The properly pre-treated metal surface of the base part is next subjected to the several process steps of this invention. In general, such steps relate to: (1) providing a thin overlay comprised essentially of chromium in adhering relation to the pre-treated metal surface, and (2) applying and fusing a high-temperature ceramic protective coating over and to the thin chromium overlay. For best results I prefer that the chromium overlay be developed by electro-depositing a chromium strike to the base part prior to subsequently applying and fusing the high-temperature ceramic protective coating over and to the chromium strike. However, excellent results are obtained when the chromium overlay is developed as through use of a diffusion process such as will hereinafter be described.

I. Chromium overlay

The step of providing a thin chromium overlay in adhering relation to an oxidation-susceptible or corrosion-susceptible metallic surface prior to coating with a high-temperature ceramic is novel and original with this invention. Such step may be accomplished using any one of several conventional application techniques; in some cases the application technique may involve several sub-process steps. As previously suggested, optimum results and advantages are obtained in my invention through use of an electro-deposition technique. However, excellent results in comparison to known metal part protection methods are obtained when diffusion deposition techniques developed for depositing chromium on steel parts are used. Also, it is suggested that a chromium overlay of the necessary thickness might be satisfactorily developed using a flame-spray technique and suitable powdered chromium material.

The following discussion first provides detail information with respect to the preferred step of electro-depositing a thin chromium overlay and is followed by a discussion of details relating to diffusion deposition technique.

A. CHROMIUM STRIKE

Next, the pre-treated metal surface is provided with a superimposed chromium strike. Such chromium strike comprises an electro-deposited metallic chromium film ranging in thickness from approximately 0.0001″ to 0.0002″. A chromium plate, on the other hand, typically varies from 0.001″ to 0.004″ in thickness. Such added thickness is not required in connection with the practice of this invention, and in some instances may prove to be a disadvantage with respect to properties developed in the end product. The prescribed chromium strike may be obtained by practice of the details set forth below.

The pre-treated metal surface is immersed as a cathode in a plating bath which contains 30 to 34 ounces of chromic acid and .30 to .34 ounce of sulfuric acid for each gallon of solution water. The following current densities may be established for the indicated periods of time to provide a suitable chromium overlay: 3.0 amperes per square inch maintained for approximately 6 minutes, 4.0 amperes per square inch maintained for approximately 4½ minutes, or 5.0 amperes per square inch maintained for approximately 3 minutes. The bath temperature should be maintained at approximately 135° F. ±5° F. Afterwards the part is suitably rinsed and preferably force-dried. It is important that the chromium strike completely cover the surfaces of the part which are to be protected.

B. DIFFUSION DEPOSITION

Numerous techniques exist for diffusing chromium and other metals into base parts. In general, the depth of diffusion may range from 1 to 5 mils and will depend upon the length of time the to-be-processed part is exposed to the "gaseous metal" at a particular elevated temperature.

In the practice of this invention the following technique has been employed to deposit chromium upon a properly pre-treated metal surface. The pre-treated part is placed in a sealed retort with a sufficient quantity of chromium halide compound. The loaded retort is placed in a furnace and heated to a temperature of from 1650° F. to 2000° F. At the prescribed elevated temperature, the chromium-containing compound is decomposed and chromium metal vapors are released within the retort. The parts and loaded retort are maintained at the elevated temperature for from 8 to 16 hours to permit the diffusion of chromium into the oxidation-susceptible surface of the metal part. Afterwards, the retort and parts are cooled and the parts removed for subsequent application of the required high-temperature ceramic protective coating as described below.

It is preferred that the diffusion deposition operation be continued for sufficient time to produce a part having chromium at the surface thereof to a penetration depth of approximately 0.001" to 0.002".

II. *Coating application*

Next, a suitable high-temperature ceramic protective coating is applied to the metal surface over the chromium overlay. Detailed information with respect to the composition of ceramic protective coatings which have proved satisfactory for use in connection with this invention will be provided hereinafter. In general, such materials are particularly selected for specific applications. Material characteristics with respect to application techniques, firing temperature, flow properties, refractory qualities, expansion-contraction characteristics, adhesion, and high-temperature thermal endurance are developed using formulation techniques which, at least in part, are known to those skilled in the art.

The ceramic protective coating is comprised of both glass frit and refractory constituents; application may be by either spraying, dipping, or sloshing a slurry mixture (slip) followed by suitable drying. In general, such ceramic protective materials are provided over the chromium strike to a depth which will result in a final fired coating thickness of 0.001" to 0.002".

The applied coating, in the case of glass frit-refractory slip mixtures, is afterwards fused to the chromium overlay by furnace firing at temperatures of from approximately 1700° F. to 2200° F. The firing schedule actually selected depends upon the composition of the coating material. Conventional furnace equipment and firing practices are employed to carry out the coating firing operation.

CERAMIC PROTECTIVE COATING MATERIALS

A glass frit-refractory type of protective coating which is preferred in the practice of this invention may be developed through use of a slip having, by weight:

| | Parts |
|---|---|
| Glass frit | 100 |
| Refractory | 2–100 |
| Suspension agent | ½–10 |
| Water | 40–70 |

Such slip is preferably applied to the metallic base or metallic surface which is to be protected against corrosion and high-temperatures by either brushing, spraying, dipping, or sloshing. The lower limit for parts by weight of refractory contained in the protective coating and contained in the slip is established with due consideration to the amount of refractory material, if any, contained in the glass frit. Detailed information will be provided hereinafter with respect to the glass frit, refractory, and suspension agent portions of the above-indicated protective coating slip. Such information will establish a better understanding as to the high-temperature glass frit-refractory type of ceramic coatings which I preferably employ in the practice of this invention.

I. *Glass frits*

Glass frits suitable for the practice of this invention include, in combination, glass and a refractory additive. Such glass frits are preferably compounded to provide particular or controlled thermal expansion characteristics and may afterwards be selected and combined in proper proportions to comprise a coating slip as hereinafter-described. Details regarding such glass frits are provided in the Example "A," Example "B," and Example "C" glass frit compositions provided in this description. In general, a mixture of refractory oxides are added to glass-forming constituents at the time the glass frit batch ingredients are mixed for smelting.

A representative cross-section of refractory additives which may be combined with the basic glass to establish a suitable frit includes the oxides of: nickel, chromium, aluminum, silicon, titanium, zirconium, iron, manganese, molybdenum, cobalt, cerium niobium vanadium beryllium and tin. Any such oxide alone or calcined or otherwise combined with other such oxides are added to the basic glass to effect the desired resultant physical properties for the glass frit. The percent weight of added refractory depends upon the degree of solubility of the particular oxide in the basic glass system. For example, the oxides of titanium, iron, manganese, and niobium are comparatively soluble in the glass during smelting and function to add thermal endurance qualities to the protective coating without developing excessive refractoriness. The oxides of cerium and cobalt are moderately soluble in the basic glass and cannot be added in large quantities without effecting a loss of flow. The oxides of nickel, chromium, aluminum, zironium, and beryllium are least soluble in the glass and small quantity additions thereof operate to develop refractoriness, heat resistance, and reduced flow characteristics in the resulting glass frit.

The ingredients which comprise the glass frit are weighed in a batch composition, thoroughly mixed, smelted, and then quenched. Three preferred glass frits are detailed as to compositions in the following examples:

EXAMPLE "A"—GLASS FRIT COMPOSITION
[Parts by weight]

| Ingredient | Range | Preferred amount |
|---|---|---|
| $SiO_2$ | 42.0–54.0 | 48.0 |
| $B_2O_3$ | 2.0– 6.0 | 4.0 |
| $Al_2O_3$ | 0.5– 2.0 | 1.0 |
| ZnO | 6.0–12.0 | 9.0 |
| $K_2O$ | 6.0– 8.0 | 7.0 |
| $Na_2O$ | 0.5– 2.0 | 1.0 |
| BaO | 21.0–39.0 | 30.0 |

EXAMPLE "B"—GLASS FRIT COMPOSITION
[Parts by weight]

| Ingredient | Range | Preferred amount |
|---|---|---|
| $SiO_2$ | 38.0–43.0 | 40.0 |
| $B_2O_3$ | 4.0– 8.0 | 6.0 |
| $Al_2O_3$ | 2.0– 4.0 | 3.0 |
| ZnO | 6.0–12.0 | 9.0 |
| BaO | 34.0–50.0 | 42.0 |

EXAMPLE "C"—GLASS FRIT COMPOSITION
[Parts by weight]

| Ingredient | Range | Preferred amount |
|---|---|---|
| $SiO_2$ | 77.0–84.0 | 81.0 |
| $B_2O_3$ | 9.0–17.0 | 13.0 |
| $K_2O+Na_2O$ | 2.0– 5.0 | 3.8 |
| $Al_2O_3$ | 1.0– 3.0 | 2.2 |

The preferred high thermal expansion glass frit composition set forth in connection with Example "A" may be developed by smelting the following glass frit batching ingredients in the indicated amounts by weight at 2500°

F. to 2650° F. until free of bubbles and afterwards quenching the molten composition:

| | Parts |
|---|---|
| Silica | 426.0 |
| Barium carbonate | 341.0 |
| Potassium carbonate | 91.5 |
| Zinc oxide | 80.0 |
| Boric oxide | 35.5 |
| Soda ash (anhydrous) | 15.0 |
| Aluminum hydrate | 11.0 |

The preferred medium thermal expansion glass frit composition set forth in connection with Example "B" may be developed by smelting the following glass frit batching ingredients in the indicated amounts by weight at 2500° F. to 2650° F. until free of bubbles and afterwards quenching the molten composition:

| | Parts |
|---|---|
| Barium carbonate | 480.0 |
| Silica | 356.0 |
| Zinc oxide | 80.0 |
| Boric oxide | 53.0 |
| Aluminum hydrate | 31.0 |

The preferred low thermal expansion glass frit composition set forth in connection with Example "C" may be developed by smelting the following glass frit batching ingredients in the indicated amounts by weight at 2500° F. to 2650° F. until free of bubbles and afterwards quenching the molten composition:

| | Parts |
|---|---|
| Silica | 752.0 |
| Nepheline-syenite | 93.0 |
| Anhydrous borax | 80.0 |
| Boric oxide | 75.0 |

Another glass frit which I have used extensively in the practice of this invention and which may be preferred for use in a coating slip and in combination with other frits when it is required that increased resistance to chemical attack be developed in the high-temperature ceramic protective coating is given below. This glass frit, which is identified as Example "D" is essentially an alkali-free frit.

EXAMPLE "D"—GLASS FRIT COMPOSITION
[Parts by weight]

| Ingredient | Range | Preferred Amount |
|---|---|---|
| PbO | 490.0–735.0 | 613.5 |
| $Al_2O_3$ | 51.0–153.0 | 71.2 |
| $SiO_2$ | 300.0–360.0 | 315.3 |

The above formulation is both the frit oxide and the frit batch composition. The preferred alkali-free frit set forth in connection with Example "D" is developed by smelting the batching ingredients in the indicated amounts by weight at approximately 2300° F. until free of bubbles and afterwards quenching the molten composition.

II. Refractory

The refractory material selected and used as a mill addition to the ceramic protective coating slip is generally comprised of one or more of the refractory oxides identified above in connection with the description of the glass frit refractory additive. The refractory material is mill-added to the slip to produce the desired firing temperature, maturing temperature, and coefficient of thermal expansion-contraction to "fit" the base metal or metal surface of the processed product. The amount of refractory included in the slip composition depends upon the refractoriness of the glass frit used in the slip. For instance, a comparatively high percentage of refractory oxide melted into the basic glass increases the frit melting temperature, reduces its flow characteristics at the maturing temperature desired, and would be used with relatively less additional refractory, if any, in the slip mill charge. On the other hand, a glass frit having a low percentage of refractory additive melted into the basic glass would have a comparatively low melting temperature and would have an increased flow characteristic at the desired maturing temperature. A comparatively larger percentage of refractory material would be combined with such a glass frit to comprise the slip composition.

Generally, I prefer that the ceramic protective coating contain a proper total quantity of refractory whereby sufficient flow is developed during firing to completely eliminate coating porosity within the first two or three minutes of the firing operation.

One particular refractory composition which may be employed in the practice of my invention has the ingredients set forth in the following example.

EXAMPLE "E"—REFRACTORY
[Parts by weight]

| Ingredients: | Preferred amount |
|---|---|
| NiO | 16.7 |
| $Cr_2O_3$ | 16.7 |
| $SiO_2$ | 66.6 |

Another mixture of refractory oxides which may be employed advantageously in a suitable ceramic coating slip formulation for use in this invention is as follows.

EXAMPLE "F"—REFRACTORY
[Parts by weight]

| Ingredients: | Preferred amount |
|---|---|
| NiO | 75.0 |
| $Cr_2O_3$ | 25.0 |

III. Suspension agent

The above-identified glass slip typically includes a suspension agent to maintain proper dispersion of the glass frit and refractory in either a water or oil vehicle. It is preferred that either enameler's clay or bentonite be used as a suspension agent in connection with this invention. Normally, a relatively lesser quantity of bentonite is required if such is used in place of enameler's clay. A good grade of purified bentonite, as commonly used with porcelain enamel materials is recommended. If enameler's clay is employed, a water-washed, air-floated enameler's grade of clay having moderate to high "set" is preferred.

APPLICATION EXAMPLES

The following information relates to use of this invention in connection with the fabrication of different panels of sheet or plate-like, low-carbon steel. In each case the low-carbon steel panel was cut to proper size and pre-treated by processing through the vapor degreasing and abrasive cleaning steps previously described herein.

Panels made of SAE 1010 type steel and having a thickness of 0.040" were, after pre-treatment, provided with a thin chromium overlay to a depth of 0.00015" using the electro-deposition method described under the heading Process Steps.

Subsequent thereto the processed panels were coated with a high-temperature ceramic material developed from a slip with the following preferred composition:

EXAMPLE "G"—PROTECTIVE COATING SLIP
[Parts by weight]

| Ingredients | Range | Preferred amount |
|---|---|---|
| Example "A" Glass Frit | 35.0–40.0 | 37.5 |
| Example "B" Glass Frit | 10.0–15.0 | 12.5 |
| Example "C" Glass Frit | 35.0–40.0 | 37.5 |
| Example "E" Refractory | 12.0–18.0 | 15.0 |
| Annealed Nickel Powder (−325 Mesh) | 7.0–8.0 | 7.5 |
| Enameler's Clay | 4.0–7.0 | 5.0 |
| Distilled Water | 50.0–60.0 | 60.0 |

The above-listed batchring ingredients were milled to a trace on a 325 mesh screen (relative to a 100 gram sample). The milled slip was afterwards applied to the pre-treated low-carbon steel panels over the electro-deposited chromium overlay to a sufficient depth whereby the resulting protective coating, after firing to maturity at 1800° F. to 1850° F., developed a thickness of from 0.001″ to 0.002″. After manufacture the coated panels were thermally cycled in a comparatively rapid manner over the range of from 1750° F. to −70° F. and in an air atmosphere for 19 complete cycles. In addition, the panels were subjected to aging at 1700° F. for 165 hours to evaluate the protection characteristics of the high-temperature ceramic coating. Careful inspection of the aged and cycled panels established that no failure of the coating or deterioration of surface metal had occurred. Standard PEI adherence and bend tests were performed on the aged and cycled panels; the results were highly satisfactory except that adherence was not quite as good as that which would have been obtained if a nickel-chromium overlay in accordance with the teachings of my co-pending application had been employed.

The invention described in this application has also been used in connection with panels fabricated or boiler plate material. Such panels were approximately ¼″ thick. However, the necessary thin chromium overlay on the boiler plate panel was developed using the diffusion deposition process previously described. The so-processed panels were then coated with a high-temperature ceramic protective coating slip having the following mill composition:

EXAMPLE "H"—PROTECTIVE COATING SLIP

[Parts by weight]

| Ingredients | Range | Preferred amount |
|---|---|---|
| Example "B" Glass Frit | 20.0–50.0 | 35.0 |
| Example "C" Glass Frit | 50.0–75.0 | 65.0 |
| Example "D" Glass Frit | 10.0–25.0 | 15.0 |
| Example "F" Refractory | 5.0–20.0 | 10.0 |
| Annealed Nickel Powder (−325 Mesh) | 5.0–15.0 | 7.5 |
| Enameler's Clay | 4.0–7.0 | 7.0 |
| Distilled Water | 50.0–60.0 | 60.0 |

The slip ingredients listed above were milled in the manner of the slip ingredients identified in connection with Example "G." Application of the coating slip to the boiler plate part having the diffusion-deposited thin chromium overlay thereon was by a spraying technique and included the covering of weld joints. The applied slip, after force-drying, was fired to maturity at a temperature of 1800° F. to 1850° F.

The coated parts were subjected to 10 repeated cycles wherein each part was heated to a temperature of approximately 1750° F. and immediately quenched in tap water at room temperature. In addition, the parts were maintained in an air atmosphere at a temperature of 1700° F. to 1750° F. for approximately 300 hours. There was no detectable failure of the high-temperature ceramic protective coating and no corrosion or oxidation of the base metal protected thereby.

Panels fabricated of 0.040″ SAE 1010 steel have also been coated with the Example "H" slip and have been carefully evaluated to determine the degree of protection obtained against chemical attack at elevated temperatures. Such panels employed a diffusion-deposited chromium overlay and were subjected to the thermal shock and aging treatments described immediately above in connection with the ¼″ panels fabricated of boiler plate material. The evaluation established that similar performance characteristics existed with respect to the 0.040″ panels. In addition, such panels were immersed in a saturated steam atmosphere for 112 hours. No deterioration of the high-temperature ceramic protective coating or the protected base metal occurred. Normally, steam atmospheres cause considerable chemical attack when acting upon ceramic protective coatings.

It is suggested that the thin chromium overlay operates to develop an improved wetting action as to the high-temperature ceramic protective coating slip applied to the base part. Such wetting action is important with respect to coating firing temperatures in the range of from approximately 1700° F. and upwards. A nickel overlay does not develop the desired wetting action. Also, the chromium overlay combines with surface metal to develop a surface which is sufficiently oxidation-resistant to permit application of the high-temperature ceramic in a successful manner. In addition, the use of a ceramic protective coating wherein glass and refractory constituents are combined in solution operates to raise the effective protection temperature of the coating. In addition, the presence of nickel metal in the coating slip formulation is for the purpose of developing an increased effective protection temperature throughout repeated thermal cycling and thermal aging operations.

Analysis of parts having surface material which is an oxidizable metal and which is processed in accordance with the teachings of this invention establishes that the high-temperature ceramic protective coating is adhered or bonded to the surface material by action of a chromium-containing alloy. Such overlay is essentially a complex metal which is comprised of chromium and metal of the surface material. Such alloy or complex metal is formed during firing of the ceramic protective coating in the case of an electro-deposited chromium strike. In the case of an overlay developed through a diffusion-deposition technique, the complex metal is generally formed during the diffusion operation. In addition to providing an improved bond between the high-temperature ceramic protective coating and the oxidizable metal of the surface material, the alloy developed by chromium is thought to provide a degree of protection against oxidation and corrosion for the base metal. Such is particularly true as to conditions which exist at the surface of the part during firing of the ceramic protective coating slip at temperatures of 1700° F. and upwards.

I claim:

1. In a method of providing a workpiece having an oxidizable metallic surface with a protective coating, the steps of: providing said oxidizable surface with an adhering chromium film in contacting relation thereto, and then providing a high-temperature ceramic protective coating in adhering relation to and over said chromium film, said high-temperature ceramic protective coating being adhered in contacting relation to said chromium film by firing in an air atmosphere at a temperature in excess of approximately 1700° F.

2. A method of coating a product having surface metal selected from the metals group consisting of steel, iron, and copper, and which comprises the sequential steps of: completely coating said product surface metal with a chromium strike, and afterwards completely coating said product with a high-temperature ceramic protective coating which is in adhering and overlay relation to said chromium strike and which is fired to maturity in an air atmosphere at a temperature which is in excess of approximately 1700° F.

3. The method defined in claim 2, wherein said high-temperature ceramic protective coating includes glass frit and refractory ingredients, said glass frit and refractory ingredients being combined in a ratio of 100 parts by weight of glass frit to from 2 to 100 parts by weight of refractory to fit the thermal expansion-contraction coefficient of said high-temperature ceramic protective coating to the thermal expansion-contraction coefficient of said product.

4. A method of providing a part having an oxidizable metal surface selected from the group consisting of steel, iron, and copper with a non-porous high-temperature ceramic protective coating, and which includes the steps of: depositing a thin chromium film on said oxidizable metal surface, applying a glass frit-refractory high-temperature ceramic protective coating slip completely over said chromium film, and firing said protective coating slip to maturity at an elevated temperature which is in the range of from approximately 1700° F. to approximately 2150° F. and in an oxygen-containing environment.

References Cited by the Examiner

UNITED STATES PATENTS

| | | | |
|---|---|---|---|
| 2,533,589 | 12/50 | Kronover et al. | 29—195 X |
| 2,708,172 | 5/55 | Robson et al. | 117—70 |
| 2,716,271 | 8/55 | Higgins | 29—195 |
| 2,826,512 | 3/58 | Rex | 117—70 |
| 2,864,721 | 12/58 | King | 117—170 |
| 3,054,694 | 9/62 | Ares | 29—195 X |
| 3,069,760 | 12/62 | Schultz | 29—195 |

DAVID L. RECK, *Primary Examiner.*

HYLAND BIZOT, *Examiner.*